Figures 1, 2, 3:
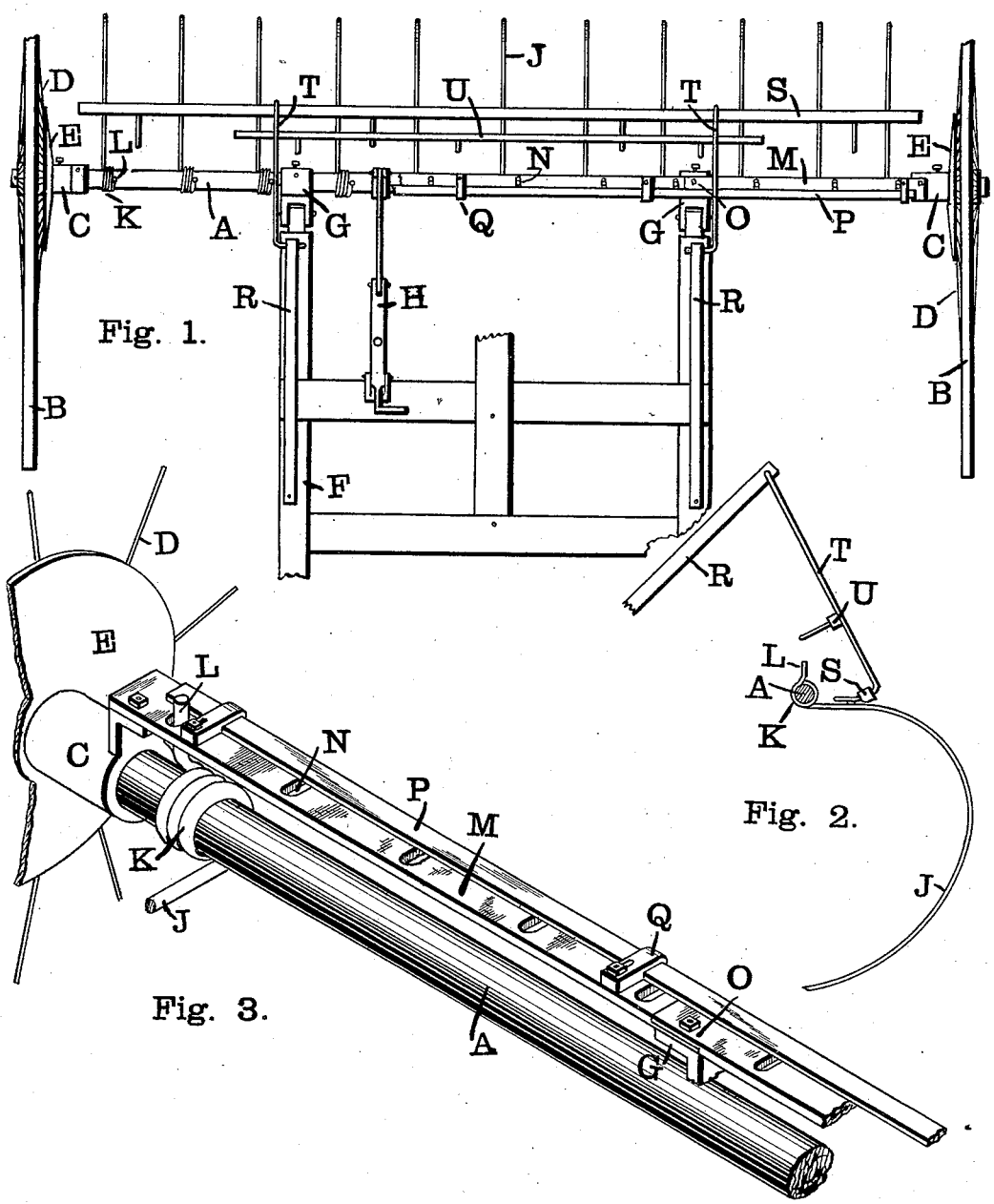

(No Model.)

F. BENTEL.
HORSE HAY RAKE.

No. 343,693. Patented June 15, 1886.

Witnesses:

Frederick Bentel
Inventor
by James W. See.
Attorney

UNITED STATES PATENT OFFICE.

FREDERICK BENTEL, OF HAMILTON, OHIO, ASSIGNOR TO JOHN W. SOHN, OF SAME PLACE.

HORSE HAY-RAKE.

SPECIFICATION forming part of Letters Patent No. 343,693, dated June 15, 1886.

Application filed September 7, 1885. Serial No. 176,423. (No model.)

*To all whom it may concern:*

Be it known that I, FREDERICK BENTEL, of Hamilton, Butler county, Ohio, have invented certain new and useful Improvements in Horse Hay-Rakes, of which the following is a specification.

This invention relates to horse hay-rakes, and will be understood from the following description, taken in connection with the accompanying drawings, in which—

Figure 1 is a plan of a horse hay-rake, illustrating my improvement, the driver's seat being omitted and sundry parts being broken away at places; Fig. 2, a transverse section of the axle, showing one tooth and the cleaning device; and Fig. 3, a perspective view of a portion of the axle upon an enlarged scale.

In the drawings, A indicates the axle of the rake, the same being a cylindrical bar, serving also as the rotatable rake-head; B, the rake-wheels, fitted to revolve loosely upon the axle; C, brackets rigidly secured one to each end of the axle just within the wheels and serving as shaft-collars against which the wheels run, and serving also as end supports for the heel-bar, which engages the heels of the teeth; D, the spokes of the wheels, the same being illustrated as formed of wire, as is the case in many forms of metallic wheels; E, disks secured, one to the inside face of each wheel, at the center of the wheel and contiguous to the brackets C; F, the usual shaft-frame of the rake, which is to be provided with a driver's seat, as usual; G, hinge-brackets rigidly secured to the axle and serving as the pivot-supports for the shaft-frame, as usual, and serving, also, as intermediate supports for the heel-bar; H, the usual lever and toggle mechanism by which the driver may give a partial rotation to the axle, and thereby lift the rake-teeth in order to dump the load; J, the rake-teeth, of well-known form, arranged in rank to the rear of the axle and having their heel ends attached thereto; K, a coil at the heel end of each tooth, such coil surrounding the axle, the fit of the coil upon the axle being sufficiently loose to permit the rotation of the coil upon the axle; L, the heels of the teeth, the same consisting of radial continuations of the wire of which the teeth and coils are formed; M, the heel-bar, consisting of a flat strip disposed parallel to the axle and bolted to the end brackets and to the hinge-brackets, so as to unite the heel-bar rigidly to the axle; N, transverse slots in the heel-bar in the plane of each tooth-heel; O, the splices of the heel-bar, the same consisting of rabbet-laps bolted at the hinge-brackets; P, the adjusting-bar, consisting of a metallic strip laid against the flat surface of the heel-bar and serving to cover more or less of the length of the slots therein; Q, clips bolted to the heel-bar by bolts engaging through slots in the clips, the clips engaging over the adjusting-bar and serving as the means for adjusting the adjusting-bar across the heel-bar and securing it in place thereon; R, braced standards projecting upwardly from the shaft-frame; S, the cleaner-bar, consisting of a light bar resting upon the top of the teeth, when the teeth are down, and provided with peg-like teeth projecting horizontally so as not to project between the teeth when said teeth are in raking position; T, suspension-rods pivoted in the standards and having their lower ends secured to the cleaner-bar, and U a bar disposed parallel to the cleaner-bar and secured to the suspension-rods at a point above the cleaner-bar.

It is found desirable that the rake-teeth of horse hay-rakes shall be capable of more or less lifting motion independent of each other—that is, the point of any tooth is to be capable of rising and falling somewhat independent of its fellows whenever the point of that tooth meets with inequalities in the ground-surface. The natural flexibility of the teeth provides to a certain extent for this motion; but the motion in such case meets with the resistance due to the stiffness of the teeth; hence the desirability of each tooth being at liberty to oscillate somewhat with reference to the axle or rake-head. This freedom for oscillation is termed "drop" of the teeth, and the amount of permissible drop is a matter to be determined by the experience of the rake-user. It will be readily understood that the play of the heels L in the slots N permits the independent oscillation of each tooth upon the axle, and that the adjusting-bar may be so set as to adjust the amount of this movement, the limits of adjustment being between the full length of the slot and zero—that is, the adjusting-bar may be so set as to prevent any movement of the heels in the slots, or it may be so set as to give the heels the whole range of the slots. The coils of the teeth furnish the bearing of oscillation as the drop movement occurs, and also serve as flexible elements in the length of the tooth. The tendency of the load is to tighten the coils to their limit, after which the flexibility becomes limited to the body of the teeth.

The heel-bar may be constructed of a single piece of wrought-iron; but in practice I prefer to cast it in short sections of malleable iron, these sections being spliced at the intermediate brackets. The spokes of the wheels tend to tangle the hay at the end of the axle where the brackets project, and thus cause a dragging of the wheels and a tendency of the rake-head to rock and dump prematurely. The disks E, rotating with the wheels, serve to prevent this.

The operation of the cleaner will be understood from Fig. 2. When the teeth are elevated, in the act of dumping, the teeth of the cleaner-bar enter between the rake-teeth, as usual, and aid in the discharge of the load. The teeth of the cleaner need not project within the circle of the rake-teeth, except as the rake-teeth are elevated, at which time the cleaner-bar rises with the rake-teeth, and the cleaner-teeth present themselves downwardly between the rake teeth. If the rake-teeth be elevated to their highest point with a sudden motion there is a liability that the points of the rake-teeth will get above the cleaner-bar, the drop of the teeth permitting momentum to carry the teeth somewhat higher than they would otherwise go. It is the purpose of the bar U to prevent the points of the teeth catching over the cleaner-bar. When the rake-teeth are highly elevated, they come in contact with the bar U, and this prevents the cleaner-bar from dropping below the points of the elevated rake-teeth.

The bar U may, if desired, be provided with teeth similar to the teeth of the cleaner-bar, so that the second bar may serve also as a second cleaner-bar.

I claim as my invention—

1. In a horse hay-rake, the combination of a cylindrical rake-head, a series of rake-teeth coiled thereon and provided with radially-projecting heels, and a heel-bar rigidly secured to the rake-head parallel thereto and provided with slots engaging said heels, and adapted to permit a movement of the heels transverse to the bar, substantially as and for the purpose set forth.

2. In a horse hay-rake, the combination of a cylindrical rake-head, a series of rake-teeth coiled thereon and provided with radially-projecting heels, a heel-bar secured to the rake-head parallel thereto and provided with slots engaging said heels, and an adjusting-bar secured to the heel-bar and adapted to limit the motion of the heels of the teeth within the slots, substantially as and for the purpose set forth.

3. In a horse hay-rake, the combination of the cylindrical rake-head A, the brackets C G, rigidly secured thereto, the rake-teeth coiled on the cylindrical rake-head, and having the heels L, the slotted heel-bar M, secured to the brackets, the adjusting-bar P, and the slotted clips Q, substantially as and for the purpose set forth.

4. In a horse hay-rake, the combination of the cylindrical rake-head A, the end brackets, C, and hinge-brackets G, rigidly secured thereto, the rake-teeth coiled on the cylindrical rake-head, and having the heels L, the slotted heel-bar M, formed in sections, with the splices secured at the hinge-brackets, the adjusting-bar P, and the clips Q, substantially as and for the purpose set forth.

5. In a horse hay-rake, the combination of a rotary rake-head, a rank of hooking rake-teeth attached thereto, standards sustaining pivot-bearings above the rake-head, a cleaner-bar resting upon the teeth to the rear of the rake-head and having cleaner-teeth projecting toward the rake-head, and disposed without the rake-teeth when the cleaner-bar rests thereon, and suspension-rods, connecting the cleaner-bar with the standards, substantially as and for the purpose set forth.

FREDERICK BENTEL.

Witnesses:
J. W. SEE,
W. A. SEWARD.